United States Patent [19]
Obenschain

[11] 3,873,913
[45] Mar. 25, 1975

[54] SHOCK RESISTANT MAGNETIC DETECTOR CORES
[75] Inventor: Arthur W. Obenschain, Silver Spring, Md.
[73] Assignee: The United States of America as represented by the Secretary of the Navy, Washington, D.C.
[22] Filed: Mar. 30, 1962
[21] Appl. No.: 184,648

[52] U.S. Cl............................................. 324/43 R
[51] Int. Cl........................................... G01r 33/02
[58] Field of Search.......... 324/43; 120/8.1; 29/530, 29/474.3, 474.4, 515, 517; 313/291, 218; 336/210, 211, 216, 217, 233, 234

[56] References Cited
UNITED STATES PATENTS
2,219,107  10/1940  Langmuir............................ 313/291
2,722,734  11/1955  Grant................................. 29/473.1
2,981,885  4/1961   Schonstedt........................... 324/43
3,076,930  2/1963   Schonstedt........................... 324/43

Primary Examiner—Richard A. Farley
Assistant Examiner—G. E. Montone

EXEMPLARY CLAIM

1. In a magnetometer, an open-ended cylindrical tube composed of a non-magnetic material and having an opening in the longitudinal sidewall thereof substantially closer to one of the open ends of the tube than to a point midway along the length of the longitudinal sidewall of the tube, a scroll-wound core composed of high permeability magnetic material disposed within said tube substantially equidistant from the ends of said tube and substantially centrally thereof, said core having a deformed portion therein in registration with said opening, and a securing means within said opening adhering to the walls thereof and in anchor-like engagement with said deformed portion, whereby the scroll-wound core is secured to the tube in a zone of decreased magnetic sensitivity at a point of anchorage providing enhanced resistance to impact breakage of said tube.

1 Claim, 3 Drawing Figures

PATENTED MAR 25 1975 3,873,913

INVENTOR.
ARTHUR W. OBENSCHAIN
BY O.E. Hodges
R. M. Hicks
ATTYS.

SHOCK RESISTANT MAGNETIC DETECTOR CORES

The invention described herein may be manufactured and used by or for the Government of the United States of America for governmental purposes without the payment of any royalties thereon or therefor.

This invention relates to magnetometers and more particularly to a shock resistant core for a total field magnetometer.

A total field magnetometer of the type contemplated by the present invention comprises three pairs of magnetometer elements arranged in three mutually perpendicular planes.

Since the axes of the three pairs of cores are mutually perpendicular, the total inductance of the cores will be constant ideally regardless of the position in which the magnetometer is placed with respect to an external uniform and constant magnetic field. Stated somewhat differently, the total inductance of the magnetometer, regardless of its orientation in a magnetic field, is proportional to the sum of the squares of the three field components, and this sum is the square of the magnetic field strength sensed by the magnetometer. A perfect total field magnetometer thus can be subjected to any and all motions both translatory and rotative in a magnetic field of constant magnitude and its inductance will remain unchanged.

In actual practice it has been found that the inductance of total field magnetometers manufactured in accordance with existing methods and processes undergoes some changes as the magnetometers are subjected to motion in a constant or uniform magnetic field. As a result of extensive study and experimentation it has been found that these motional errors in inductance cause erroneous indications of the field strength as the result of motion of the magnetometer within the field and are defined herein as magnetometer errors. In devices of this character heretofore devised it has been the usual practice to select cores during the manufacture of the device such that a reductance match between each pair of magnetometer elements is achieved. The complete magnetometer unit comprises a nonmagnetic molded block within which the three pairs of individual magnetometer core and core assemblies are rigidly mounted in mutually perpendicular spaced relation with the coils of the individual units (not shown) all connected in series thereby to provide a circuit connectable to means for receiving a signal from the magnetometer as the magnetometer moves within a nonuniform magnetic field. In military application of the device such, for example, as a marine mine adapted to be planted from an aircraft in flight, it has been found as a result of experience that a total field magnetometer receives a severe shock as the weapon enters the water at high velocity and that this shock is sufficient to produce changes in the magnetometer cores of current design such that the reductances of the various pairs are no longer matched and a magnetometer error results. This increase in magnetometer error may be sufficient to cause the associated firing mechanism to be actuated spuriously from motion effects while in a uniform background magnetic field with no target in the vicinity.

Each of the prior art magnetometer element devices comprises a scroll of magnetic material disposed within a ceramic tube and secured to the tube at a midpoint thereof by a cement applied through a slot in the tube to the scroll. Other means for securing the scroll to the mid portion of the ceramic tube include a dimple formed in the scroll in alignment with a slot at the center portion of the ceramic tube and inserting a quantity of cement through the slot sufficient to bond the scroll to the tube at the slot. Magnetometer elements of this character are disclosed and claimed in the copending application of Victor E. Legg et al. for Magnetometer Element Having a Centrally Secured Ferromagnetic Core, Ser. No. 779,910, filed Oct. 15, 1947, now U.S. Pat. No. 3,127,559.

Such devices have not been altogether satisfactory under the conditions of service for the reason that a slot formed in the center of the tube resulted in a mechanically weak structure that was subject to excessive breakage and, furthermore, would not insure that the core assemblies would withstand high-g shocks such as those experienced when a freely falling airplane-dropped weapon enters the water. Furthermore, it is considered undesirable to attach the scroll to the interior of the ceramic tube at a central portion of the scroll midway between the longitudinal end portions thereof for the reason that this center portion of the scroll is in a highly magnetically-sensitive area.

In accordance with the instant invention these undesirable features have been eliminated by attaching the Permalloy scroll core to the interior of the ceramic tube at an end portion thereof as will more clearly appear as the description proceeds.

One of the objects is to provide a new and improved shock resistant magnetometer core structure.

Another object is to provide a magnetic core structure for a total field magnetometer comprising a delicate magnetic scroll type core disposed within a ceramic tube and cemented thereto at a longitudinal end portion of the scroll.

Still other objects, advantages and improvements will be apparent from the following description taken in connection with the accompanying drawing of which:

Figure 1:
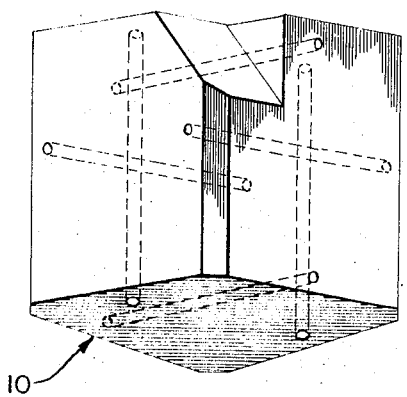
FIG. 1 is a view in perspective of a total field magnetometer unit employing the present invention.

Referring now to the drawing in which like numerals of reference are employed to designate like parts throughout the several views and more particularly to FIG. 1 thereof there is shown thereon a total field magnetometer indicated generally by the numeral 10. The total field magnetometer illustrated on FIG. 1 comprises three pairs of magnetometer elements arranged in three mutually perpendicular planes. Each of these magnetometer elements comprises a coil centered on a low relentivity magnetic core of high permeability, all of the coils (not shown) being connected in series. A suitable value of alternating current is applied to the coils in series. The reduction in inductance (reductance) of each core from its value in a zero magnetic field is proportional to the square of the field strength along its axis. Since the axes of the three pairs of cores are mutually perpendicular, the total inductance of the coils will be constant ideally regardless of the position in which the magnetometer is placed with respect to an external constant and uniform magnetic field. Stated differently, the total inductance of the magnetometer, regardless of its orientation in a magnetic field, is proportional to the sum of the squares of the three field components, and this sum is the square of the magnetic field strength sensed by the magnetometer. A perfect total field magnetometer thus can be subjected to any and all motions both translatory and rotative in a magnetic field of constant magnitude and its inductance will remain unchanged.

Figure 2:
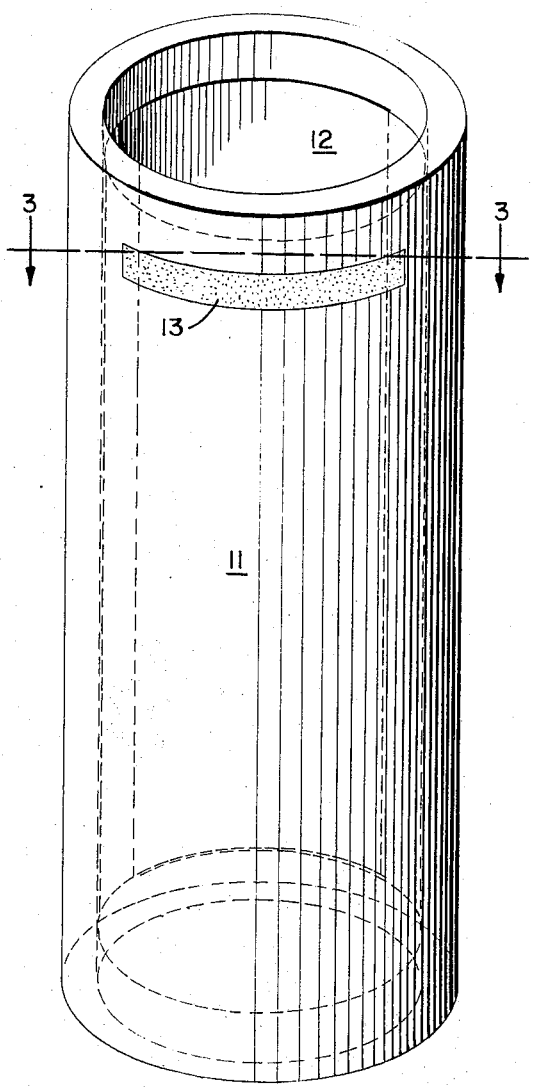
FIG. 2 is a greatly enlarged view in perspective of one of the magnetometer elements of FIG. 1.
Figure 3:
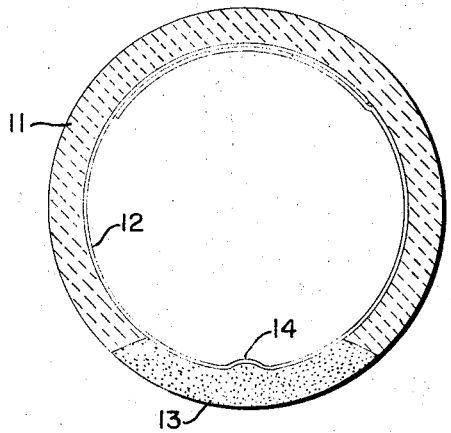
FIG. 3 is a view of the magnetometer element taken along line 3—3 of FIG. 2.

Each magnetometer element comprises a hollow ceramic tube 11 about which a coil (not shown) is disposed and within which is arranged a scroll 12 composed of magnetic material suitable for the purpose and substantially fitting the interior of the ceramic tube. The scroll is slightly shorter in length than the length of the tube and disposed centrally therein. The tube is provided with a slot 13 formed in an end portion thereof substantially as shown on FIG. 2 through which a blunt rounded point tool is inserted to form a dimple 14 in the surface of the scroll immediately adjacent thereto, care being exercised to insure that the scroll is not punctured by the tool during the dimpling process. The dimple and the tube slot are filled with a refractory cement flush with the outer surface of the tube thereby to effect a bond between the magnetic scroll at the dimpled portion thereof and the ceramic tube within which the scroll is disposed. After the cement has air dried, the core assemblies are heat treated in a dry hydrogen atmosphere for a period of time sufficient to enhance the desirable magnetic properties of the core.

In accordance with the teaching of this invention, a shock resistant core for a total field magnetometer has been provided in which the spatial geometric and magnetic relation of the cores comprising the total field magnetometer is unchanged by the shock of impact of an air-dropped mine within which the magnetometer is disposed, for example, with the surface of a body of water as the mine is dropped from an aircraft in flight at a considerable altitude and without employing a parachute to retard the free fall velocity of the mine after the mine has been released from the aircraft over a target area.

Briefly stated in summary, the invention provides a new and improved means of anchoring a magnetic scroll in a fixed position within a ceramic tube at an end portion thereof, the point of anchorage being in a much less magnetic-sensitive area than would be the case if the core were anchored to the tube at a mid portion thereof. Furthermore, by forming a slot in the end portion of the ceramic tube in lieu of a center portion thereof, fortuitous changes in reductance of the core during the manufacturing and assembling operations have been greatly reduced and the resistance to shock caused by impact of the air-dropped weapon employing the device of the instant invention with the surface of the target area has been increased sufficiently to prevent breakage of the ceramic tube and misalignment of the magnetometer elements from their geometerical and magnetic mutually spaced positions, whereby the velocity of impact with the surface of a water covered target area has been substantially increased without impairment of the finely matched and balanced relation of the magnetometer elements comprising the total field magnetometer.

A magnetometer element which has been found to be satisfactory in service comprises a tube 0.062 inch in diameter by 1.875 inch long and composed of ceramic material in which a slot approximately one thirty-second inch wide by three sixty-fourth inch deep near one end thereof has been ground. The conventional high permeability magnetic scroll is assembled centrally within the tube so that the overlap in the scroll is diametrically opposite the tube slot. A depression or dimple is formed in the scroll material by pushing through the tube slot with a blunt pointed object such, for example, as a round maple toothpick after which the dimple and slot are filled with refractory cement flush with the outer surface of the tube and, after the cement has air dried, the core assemblies are heat treated in a dry hydrogen atmosphere. A cement suitable for the purpose is preferably of the type known as Alundum cement, although, if desired, other types of cement may be employed.

Whereas the invention has been disclosed with particularity with respect to an example which gives satisfactory results, it is not so limited as various changes in the dimensions of the parts may be made without departing from the spirit and scope of the instant invention and various other changes and modifications may be made by one skilled in the art, after understanding the invention, without departing from the spirit and scope thereof, and it is intended therefore, in the appended claims, to cover all such changes and modifications.

What is claimed as new and desired to be secured by Letters Patent of the United States is:

1. In a magnetometer, an open-ended cylindrical tube composed of a non-magnetic material and having an opening in the longitudinal sidewall thereof substantially closer to one of the open ends of the tube than to a point midway along the length of the longitudinal sidewall of the tube, a scrollwound core composed of high permeability magnetic material disposed within said tube substantially equidistant from the ends of said tube and substantially centrally thereof, said core having a deformed portion therein in registration with said opening, and a securing means within said opening adhering to the walls thereof and in anchor-like engagement with said deformed portion, whereby the scrollwound core is secured to the tube in a zone of decreased magnetic sensitivity at a point of anchorage providing enhanced resistance to impact breakage of said tube.

* * * * *